3,352,923
NOVEL D-NOR-PREGNANES AND PROCESSES
FOR THEIR MANUFACTURE
Jerrold Meinwald, Ithaca, N.Y., assignor to Schering Corporation, Bloomfield, N.J., a corporation of New Jersey
No Drawing. Filed Feb. 25, 1965, Ser. No. 435,365
7 Claims. (Cl. 260—586)

This application is a continuation-in-part of my copending application Ser. No. 165,952, filed Jan. 12, 1962, now abandoned.

This invention relates to a new class of steroidal derivatives, to methods for their manufacture, and to novel intermediates produced thereby. More specifically, this invention relates to D-nor-steroids of the pregnane series which have useful, therapeutic properties and are also valuable as intermediates, to processes for their preparation, and to D-nor-steroidal intermediates produced thereby.

The D-nor-steroids of my invention possess a carbon-skeleton ring system as shown in Formula I:

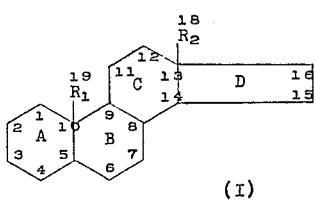

(I)

The rings are identified in the manner of conventional steroid nomenclature. Similarly, the carbon atoms of rings A, B, and C are conventionally identified. In ring D, C–17 is eliminated whereby C–16 is directly bonded to C–13. The angular groups attached to positions 10 and 13 retain conventional numbering, and as shown, $R_1$ and $R_2$ represent methyl or hydrogen.

In the conventional steroid nucleus, the six-membered C-ring is fused to the five-membered D-ring in the trans configuration. The D-nor-steroids of the instant invention also possess the trans configuration between the C-ring and the now contracted D-ring.

Heretofore, steroids having a 4-membered cyclic D-ring were unknown. By my invention it is now possible to prepare a new class of 4-membered D-ring steroids (i.e. D-nor-steroids), which are characterized by being devoid of a 17-carbon atom and by having attached to the 16-carbon atom, moieties which are identical to those substituted at C–17 of a normal steroid possessing a 5-membered D-ring. My D-nor-steroids include D-nor-pregnanes having at the 16-carbon atom a substituent containing an oxygen function, which D-nor-pregnanes, in general, possess a therapeutic activity similar to the activities of the corresponding cyclopentyl-D-ring steroidal analog.

The present invention provides a new class of 21-oxygenated-3,20-diketo-D-nor-4-pregnenes and D-nor-1,4-pregnadienes substituted at C–9 by a member selected from the group consisting of hydrogen and halogen (preferably fluorine, chlorine, and bromine) at C–11 by a member selected from the group consisting of keto, β-hydroxy, and halogen, there being a halogen at C–9 when there is a halogen at C–11; at C–16 by a member selected from the group consisting of hydrogen, hydroxy, and lower alkanoyloxy, and at C–21 by a member selected from the group consisting of hydroxy and acyloxy. In general, these D-nor-4-pregnenes possess cortical activity. In addition, some of these compounds, e.g. the 16α,21-dihydroxy-D-nor-pregnanes, possess anti-inflammatory activity and are used in the same manner as are used known corticoids such as prednisone and prednisolone.

Representative of the ester groups included in the term "acyloxy" are acid radicals of inorganic acids such as sulfuric and phosphoric acid and acid radicals of hydrocarbon carboxylic acids having up to 8 carbon atoms, which include radicals of lower alkanoic acids such as formic, acetic, propionic and butyric; radicals of aromatic carboxylic acids such as benzoic and toluic acids; and radicals of dicarboxylic acids such as maleic, succinic, and phthalic acids. Also included in the term "acyloxy" are the alkaline earth and alkali metal salts of esters of dibasic acids, e.g. a sodium salt of a hemisuccinate, phosphate, or sulfate ester.

The following additional groups may be introduced into the 16α,21-dihydroxy-D-nor-pregnanes of this invention as defined above without interfering with the process of this invention and there will be formed derivatives possessing cortical activity and/or which are valuable as intermediates, the 11α-hydroxy and the 9(11)-dehydro-derivatives being valuable mainly as intermediates.

Hydroxy or acyloxy groups at positions such as C–6, 11, 15, and 20, as well as C–3 when there is a $\Delta^5$- bond including derivatives thereof such as 15α,16α-alkylidenedioxy derivatives and the 16α,21-alkylidenedioxy derivatives;

Alkyl group containing up to 4 carbon atoms, and particularly methyl, such as at C–2, 6, 15, and 21;

Lower alkylene groups, and particularly methylene, at positions such as at C–6 and C–15;

Halogeno groups, and particularly fluorine and chlorine, such as at C–6 and 15;

Unsaturated linkages such as a C–6 and 9(11);

Other modifications of the A and B-ring such as saturated A and B-ring compounds; 4,5-dihydro-1,5-bis-dehydro analogs, 4,5-dihydro-3-hydroxy and 4,5-dihydro-5-dehydro-3-hydroxy analogs and the 3-acyloxy derivatives thereof.

It is to be understood that the above are given as exemplary, it being possible to prepare a D-nor-steroid corresponding to every known C–17 steroid by utilizing procedures known in the art for the normal cyclopentyl-D-ring steroids and substituting as starting compounds the corresponding D-nor-steroid.

This invention provides for the following specific 21-oxygenated - 3,20-diketo-D-nor-4-pregnenes: D-nor-corticosterone (D - nor - 4-pregnene-11β,21-diol-3,20-dione), D - nor - desoxycorticosterone (D - nor-4-pregnene-21-ol-3,20 - dione), D - nor-16α-hydroxy-desoxycorticosterone (D - nor-4-pregnene-11β,16α,21-triol-3,20-dione), D-nor-prednisone (D - nor-1,4-pregnadiene-16α,21-diol-3,11,20-trione), D - nor - prednisolone (D - nor-1,4-pregnadiene-11β,16α,21 - triol-3,20-dione), 9α,11β-dichloro-D-nor-1,4-pregnadiene - 16α,21 - diol - 3,20 - dione, the 6(α and β)-methyl, 6(α and β)-fluoro-, 15-methylene-, 16α-methyl- and 15β-methyl- analogs thereof, as well as their 9α-halogeno derivatives, e.g. 9α-fluoro-D-nor-prednisone, 9α - fluoro-D-nor-prednisolone, 15-methylene-D-nor-prednisolone, 15α - methyl - D-nor-prednisone, 9α-fluoro-15α-methyl-D-nor-prednisone, 6α-methyl-D-nor-prednisolone, 6α,15α - dimethyl - D - nor-prednisone, 6α-fluoro-D-nor-prednisolone, D - nor - 1,5-pregnadiene-11β,21-diol-3,20-dione and the like.

The compounds of this invention, i.e. the 21-oxygenated- 3,20-diketo-D-nor-4-pregenes, may be administered orally or parenterally by incorporating a therapeutic dosage in conventional dosage forms such as tablets, capsules, elixers, suspensions, solutions, or the like. They can be administered in admixture with pharmaceutical excipients such as, for example, cornstarch, lactose, sucrose, and gum arabic usually in admixture with an additive such as magnesium stearate, talc and the like. The compositions may contain diluents and dispersing and surface active agents and may be presented in a syrup, or in a non-aqueous or aqueous suspension, or in a syrup or an oil.

The 3-keto-D-nor-4-pregnenes are prepared from 16β-carboxy-D-nor-steroids such as D-nor-4-androstene-3-one-16β-carboxylic acid by employing techniques analogous to methods known in the art for converting the carboxylic acid moiety in a C–17 carboxylic acid steroid to a 17-acetyl, or other 17-substituents of known, normal cyclopentyl-D-ring steroids.

The 16β-carboxy-D-nor-steroids, necessary intermediates for the preparation of the novel D-nor-pregnanes of this invention, are prepared from 17-keto-androstanes and 17-keto-estranes unsubstituted in the 16-position via my novel process as described in my U.S. Patent No. 3,113,142. In brief, this process is represented by the following reaction scheme A wherein R represents the A, B, and C-rings of a steroid:

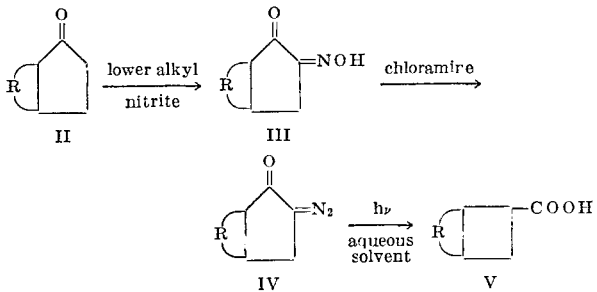

Exemplary of 16β-carboxy-D-nor starting compounds prepared as disclosed hereinabove are D-nor-androstane-3β-ol-16β-carboxylic acid, D-nor-androstane-3α-ol-16β-carboxylic acid, D-nor-androstane-3-one-16β-carboxylic acid, D-nor-4-androstene-3-one-16β-carboxylic acid, D-nor-5-androstene-3β - ol - 16β - carboxylic acid, D-nor-4-androstene - 3,11 - dione-16β-carboxylic acid, D - nor-4-androstene-11β-ol-3-one-16β-carboxylic acid, D-nor-1,4-androstadiene-3,11-dione-16β-carboxylic acid, D-nor-1,4,9(11)-androstadiene - 3 - one - 16β - carboxylic acid, 9α-fluoro-D-nor-1,4-androstadiene - 11β-ol-3-one-16β-carboxylic acid, 6α-methyl-D-nor-1,4-androstadiene-3,11-dione-16β-carboxylic acid, 6α-fluoro-D-nor-1,4-androstadiene-3,11-dione-16β-carboxylic acid and the like.

An example of the preparation of a 3-keto-D-nor-pregnane of this invention from a 16-carboxy-D-nor-androstane such as those listed above by utilizing transformations similar to those used in known conversions involving C-17-cyclopentanoid-D-ring steroid structures is as follows:

D-nor-desoxycorticosterone 21-acetate (i.e., D-nor-4-pregnene-21-ol-3,20-dione 21-acetate) is derived from D-nor-4-androstene-3-one-16β-carboxylic acid (prepared by the ultraviolet irradiation of 16-diazo-4-androstene-3,17-dione, in turn, derived from 16-diazo-5-androstene-3β-ol-17-one by the action of *Flavobacterium dehydrogenans*) by first converting the D-nor-16β-carboxy steroidal starting compound to the corresponding 16β-acid chloride by treatment with a reagent such as thionyl chloride, phosphorous trichloride, phosphorous pentachloride, and preferably oxalyl chloride. The D-nor-4-androstene-3-one-16β-carboxylic acid chloride thereby formed is then allowed to react with diazo-methane followed by subsequent treatment of the thereby formed 21-diazo-D-nor-4-pregene-3,20-dione with acetic acid whereby is obtained D-nor-desoxy corticosterone acetate.

The 16α- and 21-hydroxyl groups are introduced into the D-nor-pregnane molecule by techniques such as those described in Example 2 whereby 21-diazo-D-nor-4-pregnene-3,20-dione is converted to D-nor-4-pregnene-16α,21-diol-3,20-dione.

An 11-hydroxyl function may be introduced into the molecule via conventional methods; the microbiological techniques are convenient, the microorganism *Curvularia lunata* (N.R.L.L. 2380) being used to introduce an 11β-hydroxyl group and *Glomerella cingulata* (A.T.C.C. Nos. 10,529–10,534) for the introduction of an 11α-hydroxyl group. Thus, D-nor-4-pregnene - 16α,21 - diol-3,20-dione when subjected to *Curvularia lunata* is converted to D-nor - hydrocortisone (D-nor-4-pregnene-11β,16α,21-triol-3,20-dione). Esterification of the C–21 hydroxyl group with acetic anhydride in pyridine followed by the chromic acid/sulfuric acid oxidation of the 11-hydroxyl group in the resulting D-nor-hydrocortisone 21-acetate yields D-nor-cortisone 21-acetate (i.e., D-nor-4-pregnene-16α,21-diol-3,11,20-trione 21-acetate).

Introduction of a Δ¹- double bond into my novel D-nor-pregnanes possessing a 3-keto-Δ⁴- system may be effected by known chemical methods such as by means of selenium dioxide or by the use of dichlorodicyanobenzoquinone or, alternatively, by microbiological methods utilizing microorganisms such as *Corynebacterium simplex* (A.T.C.C. 6946). For example, D-nor-cortisone, and D-nor-hydrocortisone (prepared as described hereinabove) are subjected to the action of *Corynebacterium simplex* according to procedures described in U. S. Patent No. 2,837,464 for conversion to D-nor-prednisone (D-nor-1,4-pregnadiene-16α,21-diol-3,11,20-trione), and D-nor-prednisolone (D-nor-1,4-pregnadiene - 11β,16α,21 - triol - 3,20-dione), respectively.

In general, unsaturation may be introduced into a saturated A-ring by first converting a 3-hydroxyl group present to a 3-ketone (by oxidation with chromic oxide, for example) followed by treatment with selenium dioxide or by bromination followed by dehydrobromination in the usual manner.

The 6-dehydro analogs of D-nor-pregnanes may be prepared directly from the corresponding 3-keto-D-nor-4-pregnene-, or 3-keto-D-nor-1,4-pregnadiene- steroids (e.g., 9α-fluoro-D-nor-prednisolone 21-acetate) by dehydrogenation with an agent such as chloranil in refluxing xylene; or by the allylic halogenation with agents such as N-bromosuccinimide to form the corresponding 6-bromo- intermediate (e.g., 6 - bromo - 9α - fluoro-D-nor-prednisolone 21-acetate) and subsequent dehydrohalogenation in refluxing collidine or lutidine to give corresponding 6-dehydro compounds, e.g., 9α-fluoro-D-nor-6-dehydro-prednisolone 21-acetate.

The 3-keto-6-halogeno-D-nor - 1,4 - pregnadienes prepared as described in the preceding paragraph are also valuable as intermediates in preparing D-nor-1,5-pregnadienes (exemplified by the 4,5-dihydro-1,5-bis-dehydro analogs of the 3,20-diketo-D-nor-4-pregnenes described hereinabove) by reaction with zinc in ethanol, utilizing procedures analogous to those described in U.S. Patent No. 2,908,696. Thus, allylic bromination of D-nor-prednisolone 21-acetate by means of N-bromosuccinimide, followed by reaction of the thereby formed 6β-bromo-D-nor-prednisolone 21-acetate with zinc in ethanol will yield D - nor - 1,5 - pregnadiene-11β,16α,21-triol-3,20-dione 21-acetate, valuable as a cortical, anti-inflammatory agent with diminished cortical side effects.

Introduction of a 9(11)-double bond and the subsequent introduction of 9,11-halohydrins and 9α,11β-dihalogeno derivatives into my novel D-nor-steroids is also effected by methods analogous to those used in the C–17 cyclopentanoid-D-ring steroidal art. Thus, by subjecting D-nor-4-pregnene-16α,21-diol-3,20-dione to the action of *Glomerella cingulata* followed by treating the resulting 11α-hydroxy derivative to the action of the organism *Corynebacterium simplex* there is obtained D-nor-1,4-pregnadiene-11α,16α,21-triol-3,20-dione. Selective acetylation of the C–21 hydroxyl group of the latter compound, followed by esterification of the 11-hydroxyl with methane sulfonyl chloride in pyridine yields the mixed ester D-nor-1,4-pregnadiene-11α,16α,21-triol-3,20 - dione 11-methanesulfonate 21-acetate. Reaction with sodium acetate in acetic acid converts this mixed ester to the corresponding 9(11)-dehydrosteroid, i.e., D-nor-1,4,9(11)-pregnatriene-16α,21-diol-3,20-dione 21-acetate. Alternatively, 9(11)-dehydro-D-nor-steroids such as the aforementioned may be conveniently prepared from an 11β-hydroxy steroid by the action of methanesulfonyl chloride in dimethylformamide. Thus, D-nor-prednisolone 21-acetate may be converted in one step to D-nor-1,4,9(11)-pregnatriene-16α,21-diol-3,20-dione 21-acetate by reaction with methanesulfonyl chloride.

The D-nor-9(11)-dehydropregnanes, are valuable as intermediates in preparing the corresponding 9,11-halohydrins and 9,11-dihalogeno derivatives. For example, treatment of D-nor-1,4,9(11)-pregnatriene-16α,21-diol-3,20-dione 21-acetate with N-bromoacetamide and perchloric acid in aqueous dioxane results in the corresponding bromohydrin, i.e. 9α-bromo-D-nor-prednisolone 21-acetate (9α-bromo-D-nor-1,4-pregnadiene - 11β,16α,21 - triol-3,20-dione 21-acetate). Treatment of the latter compound with potassium acetate in acetone results in the corresponding 9β,11β-oxido derivative, i.e. 9β,11β-oxido-D-nor-1,4-pregnadiene-16α,21-diol-3,20-dione 21-acetate. By the action of hydrofluoric acid or hydrochloric acid on this oxido intermediate there may be prepared the corresponding chlorohydrin and fluorohydrin derivatives. Thus, when hydrogen fluoride is added to 9β,11β-oxido-D-nor-1,4-pregnadiene-16α,21-diol-3,20-dione 21-acetate there is obtained 9α-fluoro-D-nor-prednisolone 21-acetate (9α-fluoro-D-nor-1,4-pregnadiene - 11β,16α,21 - triol-3,20-dione 21-acetate); whereas the action of hydrogen chloride on the aforenamed 9,11-oxido-D-nor-steroid will produce 9α-chloro-D-nor-prednisolone 21-acetate.

The 9(11)-dehydro-D-nor-steroids are also valuable as intermediates in preparing the corresponding 9α,11β-dihalogeno-D-nor-steroids by utilizing techniques on my D-nor-9(11)-dehydro-steroids similar to those described in U.S. Patents Nos. 2,894,963, and 3,009,928–3,009,933. For example, D-nor-1,4,9(11)-pregnatriene-16α,21-diol-3,20-dione 21-acetate upon reaction with chlorine in chloroform yields 9α,11β-dichloro-D-nor-1,4-pregnadiene-16α,21-diol-3,20-dione 21-acetate whereas reaction with N-bromoacetamide and hydrogen chloride in acetic acid will give 9α-bromo-11β-chloro-D-nor-1,4-pregnadiene-16α,21-diol-3,20-dione 21-acetate.

It is to be understood that in the specification and in the examples, the conversions shown are by way of illustration only, it being obvious to one skilled in the art that analogous transformations may be carried out when other intermediates are used.

When preparing D-nor steroids of this invention which are substituted at one or more of carbon atoms 2,4,6,9,11, and 15, for example, it is preferable to have all the substituents in the 16β-carboxy-D-nor-steroid starting intermediate prior to building up the C–16 pregnane side chain or the subsequent conversion thereof to the corresponding 16α,21-dihydroxy-cortical pregnanes as described herein; however, substituents may be introduced in the molecule at any point during the preparation of the D-nor-pregnanes by utilizing procedures known in the art.

Thus, for example, to prepare 6α-methyl-D-nor-hydrocortisone and analogs thereof, one may introduce the 6-methyl group into D-nor-hydrocortisone, by utilizing procedures known in the art for the normal cyclopentyl-D-ring steroids; or, alternatively and preferably, one may utilize a starting intermediate already possessing the 6α-methyl group and build up the cortical side chain as described herein. The following exemplify both methods of preparing 6α-methyl-D-nor-hydrocortisone and analogs thereof:

To introduce the 6-methyl group into D-nor-hydrocortisone, the aforementioned D-nor-corticoide is first converted to its 3,20-bis-ethylene-ketal derivative, followed by epoxidation of the 5,6- double bond thereof with a per-acid such as perbenzoic acid. Reaction of the thus formed 5α,6α-oxido-D-nor-hydrocortisone - 3,20 - bis-ethylene ketal with a Grignard reagent such as methyl magnesium-bromide gives the corresponding 5α-hydroxy-6β-methyl derivative. The ketal groups are removed by means of dilute sulfuric acid which simultaneously dehydrates the 5α-hydroxy group and epimerizes the 6β-methyl group to 6α-methyl, giving 6α-methyl-D-nor-hydrocortisone, which when subjected to the action of *Corynebacterium simplex* yields 6α-methyl-D-nor-prednisolone, a potent cortical anti-inflammatory agent. If hydrofluoric acid is added to the 5α,6α-oxido-D-nor-hydrocortisone-3,20-bis-ethylene ketal intermediate, there is obtained the 5α-hydroxy-6β-fluoro-D-nor-hydrocortisone-3,20-bis-ethylene ketal intermediate, which when reacted with ethanolic hydrochloric acid will form 6α-fluoro-D-nor-hydrocortisone which is converted by means of *Corynebacterium simplex* to the 1-dehydro analog-6α-fluoro-D-nor-prednisolone, another potent cortical anti-inflammatory agent.

Alternatively, and preferably, to prepare 6α-methyl-D-nor-hydrocortisone, there is utilized as starting intermediate 6α-methyl-D-nor-4-androstene-3,11-dione-16β-carboxylic acid (prepared from 6α-methyl-4-androstene-3,11,17-trione by procedures analogous to those described in my U.S. Patent No. 3,113,142), via procedures analogous to those of Example 1 of this application, 6α-methyl-D-nor-4-androstene-3,11-dione-16β-carboxylic acid is converted to the corresponding acid chloride and thence to 21-diazo-6α-methyl-D-nor-4-pregnene-3,11,20-trione. Using procedures analogous to those of Example 2 described herein, the aforenamed 21-diazo-D-nor intermediate is converted to 21,21-dibromo-6α-methyl-D-nor-4-pregnene-3,11,20-trione which is subjected to the Favorskii rearrangement utilizing sodium methylate to give methyl 6α-methyl-D-nor - 4,16(20) - pregnadiene-3,11-dione 21-oate which, in turn, after conversion to the 3-ethylene ketal derivative, is reduced with lithium aluminum hydride followed by hydrolysis of the ketal group to give 6α-methyl-D-nor-4,16(20)-pregnadiene-11β,21-diol-3-one. Introduction of the 16α-hydroxy group is effected by oxidation of the 21-acetate ester of the aforenamed D-nor-11β-21-diol with hydrogen peroxide in t-butanol in the presence of osmium tetroxide and pyridine giving 6α-methyl-D-nor-hydrocortisone 21-acetate (6α-methyl-D-nor-4-pregnene-11β,16α,21-triol-3,20-dione 21-acetate). Oxidation of 6α-methyl-D-nor-hydrocortisone acetate with chromic oxide in sulfuric acid will give the corresponding 11-keto compound, i.e. 6α-methyl-D-nor-cortisone 21-acetate. Hydrolysis of the 21-acetate esters is effected by means of potassium carbonate giving 6α-methyl-D-nor-hydrocortisone and 6α-methyl-D-nor-cortisone. Introduction of a double bond between $C_1$ and $C_2$ by means of *Corynebacterium simplex* according to the procedure of Example 29 herein yields 6α-methyl-D-nor-prednisolone (from 6α-methyl-D-nor-hydrocortisone) and 6α-methyl-D-nor-prednisolone (from 6α-methyl-D-nor-cortisone).

Substituents such as α-hydroxy, α and β-lower alkyl, and α- and β-halogeno may be introduced into the D-nor steroid nucleus at C–15 utilizing procedures similar to known methods for the introduction of these moieties at C–16 of a C–17 cyclopentanoid-D-ring steroid. For example, to introduce a 15α-methyl group into D-nor-pregnenolone (D-nor-5-pregnene-3β-ol-20-one) (prepared as described heretofore and in Example 24), the requisite 15-dehydro intermediate is first prepared by brominating D-nor-pregnenolone in chloroform with bromine, followed by treatment of the 5,6,16-tribromo derivative thereby formed with sodium iodide in acetone to give 16-bromo-D-nor-5-pregnene-3β-ol-20-one which is heated with collidine to give the desired D-nor-5,15-pregnadiene-3β-ol-20-one. In similar manner, when D-nor-pregnane-3β-ol-20-one is brominated then dehydrobrominated as described above, there is obtained D-nor-15-pregnene-3β-ol-20-one. Addition of a standard Grignard reagent, such as methyl magnesium iodide to a 15-dehydro-D-nor-steroid utilizing known techniques will result in the production of the corresponding 15α-methyl derivative, e.g., 15α-methyl-D-nor - 5-pregnene-3β-ol-20-one. When other 15α-lower alkyl derivatives are desired, other corresponding lower alkyl Grignard reagents are employed, e.g. ethylmagnesium bromide and isopropyl magnesium iodide or t-butyl magnesium iodide, whereby is obtained the corresponding 15α-ethyl-, 15α-isopropyl-, and 15α-t-butyl derivatives of D-nor-5-pregnene-3β-ol-20-one.

One method of introducing a 15β-lower alkyl group into a D-nor-steroid such as D-nor-5α-15-pregnene-3β-ol-20-one, involves reaction of the 15-dehydro-bond with diazomethane whereby is obtained 15,16-pyrazoline-D-nor-5α-pregnane - 3β-ol-20-one which, after pyrolysis at or above the melting point of the pyrazoline intermediate yields the corresponding 15-methyl - 15-dehydro-D-nor-steroid, e.g. 15-methyl-D-nor - 5α-15-pregnene - 3β-ol-20-one. Although it is preferred to pyrolyze by heating the pyrazoline above its melting point, such pyrolysis may be effected by heating the substance in a high boiling, inert solvent, such as p-cymene, or tetralin or the like. The unsaturation at C-15 in the D-nor-ring is conveniently removed by reductive hydrogenation preferably in the presence of a catalyst, such as palladium, whereupon there is obtained 15β-methyl-D-nor-5α-pregnane - 3β-ol-20-one 3-acetate. In a similar manner, D-nor-5,15-pregadiene-3β-ol-20-one upon reaction with diazomethane followed by pyrolysis and subsequent partial hydrogenation, yields 15β-methyl-D-nor-5-pregnene - 3β-ol-20-one. Where the 15β-ethyl, 15β-propyl, or 15β-butyl derivative is desired, the corresponding diazoethane, diazopropane, diazobutane, or the like is used in the aforedescribed procedure.

The 15-alkyl-15-dehydro intermediates prepared as described above are also valuable intermediates in the preparation of novel 15-methylene-D-nor-steroids. Thus, utilizing known techniques, 15-methyl-D-nor-5,15-pregnadiene-β-ol-20-one upon treatment with alkaline hydrogen peroxide yields the corresponding 15α,16α-epoxide, i.e. 15α,16α-oxido-15β-methyl-D-nor - 5-pregnene-3β-ol-20-one. Treatment of the 15α,16α-oxido-D-nor-steroid with a hydrogen halide, e.g. hydrogen bromide produces the corresponding 15-methylene-16α-hydroxy derivative, e.g. 15-methylene-D-nor-5-pregnene - 3β,16α-diol-20-one. The action of the microorganism *Flavobacterium dehydrogenans* utilizing conventional techniques will convert 15-methylene-D-nor-5-pregnene-3β,16α-diol-20-one to 15-methylene - 16α-hydroxy-D-nor-progesterone (15-methylene-D-nor - 4-pregnene-16α-ol-3,20-dione) which may be acetylated with acetic anhydride and p-toluene sulfonic acid to give 15-methylene - 16α-acetoxy-D-nor-progesterone, which is a potent progestational agent via the oral route.

From the 15-methylene-16α-hydroxy-D-nor-progesterones produced as described hereinabove, there may be obtained valuable 21-oxygenated 15-methylene pregnanes possessing cortical activities. Thus, for example, 15-methylene-16α-hydroxy-D-nor-progesterone is transformed by oxidation with *Rhizopus nigricans* into the corresponding 11α-hydroxy derivative, which, in turn, is transformed by the action of iodine/calcium oxide into the 21-iodo derivative, transformed by acetolysis into the 21-acetoxy derivative, 15-methylene-D-nor-4-pregnene - 11α,16α,21-triol-3,20-dione 21-acetate. The conversion of the 11α-hydroxy system to the corresponding 9α-fluoro-11β-hydroxy system follows methods similar to those well-known in the art as described heretofore whereby is obtained 9α-fluoro - 15-methylene-D-nor-hydrocortisone 21-acetate, which on incubation with *Corynebacterium simplex* gives 9α-fluoro - 15-methylene-D-nor-prednisolone, a powerful corticoid, valuable as an anti-inflammatory. Alternatively, treatment of 15-methylene-16α-hydroxy-D-nor-progesterone with the microorganism *Curvularia lunata* gives the corresponding 11β-hydroxy derivative, 15-methylene-D-nor-4-pregnene - 11β,16α-diol-3,20-dione which after treatment with iodine/calcium oxide to the 21-iodo derivative followed by acetolysis yields 15-methylene-D-nor-hydrocortisone 21-acetate; the latter is converted to the 15-methylene - D-nor-prednisolone by *Corynebacterium simplex*.

The 15-methylene - D - nor - steroids prepared as described hereinabove are convertible by reduction into the corresponding 15α- and 15β-methyl analogs. Thus, for example, 15-methylene-D-nor-prednisolone and 9α-fluoro-15-methylene-D-nor-prednisolone upon reduction with one equivalent of hydrogen with palladium on charcoal as catalyst yields a mixture of the 15α-methyl and 15β-methyl isomers of 15-methyl-D-nor-prednisolone and 9α-fluoro - 15-methyl-D-nor-prednisolone respectively which are each separated utilizing chromatographic techniques whereby there is obtained 15α-methyl-D-nor-prednisolone and 15β-methyl-D-nor-prednisolone and 9α-fluoro - 15α-methyl-D-nor-prednisolone and 9α-fluoro - 15β-methyl-D-nor-prednisolone.

The introduction of a 15α-hydroxyl group into my novel, 15-unsubstituted-D-nor-steroids is conveniently effected utilizing microorganisms such as *Hormodendrum olivaceum*. (A.T.C.C. 13, 596), *Colletotrichum antirrhea*, *Penicillium notula*, *Calonectria decora* (by methods disclosed in German Patent 1,067,020) *Gibberella baccata* and *Gibberella saubineth*. A preferred method is to introduce the 15α-hydroxy group via *Hormodendrum olivaceum* (A.T.C.C. 13, 596) according to procedures similar to those described for a C-17 cyclopentyl-D-ring steroid by S. Bernstein et al. J. Am. Chem. Soc. 82, 3685 (1960). Thus, utilizing these known techniques, D-nor-4-pregnene-16α,21-diol-3,20-dione (prepared as described in Example 35 herein) when subjected to the action of *Hormodendrum olivaceum* is converted to the corresponding 15α-hydroxy derivative, i.e. D - nor - 4 - prepnene - 15α,16α,21 - triol - 3,20-dione. Introduction of an 11β-hydroxyl group by means of *Curvularia lunata* followed by microbiological dehydrogenation at C-1 and C-2 with *Corynebacterium simplex* gives D nor - 1,4 - pregnadiene - 11β,15α,16α,21 - tetrol-3,20-dione.

Similarly, 6α-methyl-D-nor-cortisone, 6α-methyl-D-nor-hydrocortisone, 6α - methyl - D - nor - prednisone, 6α - methyl-D-nor-prednisolone (prepared as described hereinabove) may be converted to the corresponding 15α-hydroxyl derivative by the action of *Hormodendrum olivaceum* yielding 6α-methyl-15α-hydroxy-D-nor-cortisone, 6α - methyl - 15α - hydroxy - D - nor - hydrocortisone, 6α-methyl - 15α - hydroxy - D - nor - prednisone, and 6α - methyl - 15α - hydroxy - D - nor - prednisolone, respectively. Esterification of the foregoing 15α,16α,21-triols by means of acetic anhydride in pyridine yields the corresponding 15,21-diacetate esters.

To introduce a halogen, e.g. fluorine at the 15-carbon of a D-nor-steroid techniques are employed similar to those used for introducing a 16-halogen in a normal, 5-membered D-ring steroid. For example, to prepare the corticoid, 15α-fluoro-D-nor-prednisolone 21-acetate, one may use as a starting intermediate D-nor-4,16(20)-pregnadiene - 21 - ol - 3,20 - dione (prepared from 21 - diazo - D - nor - progesterone as shown in Example 1). An 11β-hydroxyl function is introduced by the action of the microorganism *Curvularia lunata*, followed by treatment of the resulting D - nor - 4,16(20) - pregnadiene - 11β,21 - diol - 3 - one to the action of *Corynebacterium simplex* whereby the 1-dehydro analog is formed, i.e. D-nor-1,4,16(20)-pregnatriene-11β,21-diol-3-one. After esterification of the 21-hydroxy function with acetic anhydride in pyridine, introduction of a 15α-hydroxy function effected via microbiological techniques as described hereinabove yields the triol - triene, D - nor - 1,4,16(20) - pregnatriene - 11β,15α, 21 - triol - 3 - one 21 - acetate. Reaction with thionyl chloride in tributylamine results in the formation of 20-chloro-D - nor - 1,4,15 - pregnatriene - 11β,21 - diol - 3 - one 21 - acetate which, upon titration with 0.1N sodium hydroxide gives 20,21 - oxido - D - nor - 1,4,15 - pregnatriene - 11β - ol - 3 - one. Treatment of the latter compound with hydrogen fluoride followed by acetylation of the 15α - fluoro - D - nor - 1,4,16(20) - pregnatriene - 11β,21 - diol - 3 - one thereby produced yields the corresponding 21-acetate ester which when oxidized with N-methylmorpholine oxide-peroxide in the presence of osmium tetroxide yields 15α-fluoro-D-nor-prednisolone al-acetate, which possesses anti-inflammatory activity.

Another method of introducing a 15-halogen (and specifically a 15β-halogen) into a D-nor-pregnane utilizes as an intermediary compound methyl D-nor-5α-16(20)-pregnene-3β-ol-21-oate which is prepared utilizing techniques similar to those described herein in Examples 26 and 32. Thus, the acid chloride of 16α-carboxy-D-nor-androstane-3β-ol 3-acetate is converted to 21 - diazo - D - 5α - pregnene - 3β - ol - 20 - one 3 - acetate by treatment with diazomethane. Reaction of the diazoketone with bromine to give the 21,21-dibromide, followed by Favorskii rearrangement with sodium methoxide yields the intermediate, methyl D - nor - 5α - 16(20) - pregnene - 3β - ol - 21 - oate. Esterification of the latter compound to the 3-acetate followed by bromination with N-bromosuccinimide in carbon tetrachloride gives methyl 15α - bromo - D - nor - 5α - 16(20) - pregnene - 3β - ol - 21 - oate 3 - acetate. Displacement of the bromine atom with silver fluoride in acetonitrile results in the formation of methyl 15β - fluoro - D - nor - 5α - 16(20) - pregnene - 3β - ol - 21 - oate 3 - acetate. Solvolysis of the 3 - acetate group in methanol in the presence of boron trifluoride etherate followed by oxidation of the 3-hydroxy function with chromic acid gives methyl 15β - fluoro - D - nor - 5α - 16(20) - pregnene - 3 - one - 21 - oate. Conversion of the latter compound to the 3-ethylene ketal with ethylene glycol in benzene under acid catalysis, followed by reduction with lithium hydride in tetrahydrofuran at 0° C. and acetylation of the resulting product with acetic anhydride in pyridine and, finally, deketalization by treatment with hot aqueous acetic acid gives a key intermediate, 15β - fluoro - D - nor - 5α - 16(20) - pregnene - 21 - ol - 3 - one 21 - acetate. Oxidation of this D - nor - 5α - 16(20) - pregnene - intermediate with N-methylmorpholine oxide-peroxide in the presence of osmium tetroxide gives 15β - fluoro - D - nor - 5α - pregnane - 16α,21 - diol - 3,20 - dione 21 - acetate which is converted to the 1,4-bis-dehydro analog by bromination in dioxane with 2 molar equivalents of bromine to give the 2,4-dibromo derivative and subsequently dehydrobromination in dimethylformamide in the presence of lithium bromide and calcium carbonate to yield 15α - fluoro - D - nor - 1,4 - pregnadiene - 16α,21 - diol - 3,20 - dione 21 - acetate. Hydroxylation with *Curvularia lunate* at the 11β-position gives the desired compound 15β - fluoro - D - nor - prednisolone acetate.

As disclosed hereinabove, my D-nor-steroids will undergo the same conversions and reactions known in the steroid art for the normal C-17-cyclopentyl-D-ring steroids. Some further typical conversions whereby are prepared D-nor-steroidal derivatives which are either therapeutically active *per se* or are valuable as intermediates are disclosed hereinbelow.

For example, D-nor-aldosterone is derived from D-nor-4-pregnene-21-ol-3,20-dione which, in turn, is prepared by hydrolyzing the 21-acetate ester thereof, (the compound of Example 1 of this application) by means of potassium carbonate according to the procedure of Example 2H. An 11β-hydroxyl group is first introduced by means of the microorganism *Curvularia lunata* followed by treatment of the resulting D-nor-4-pregnene-11β,21-diol-3,20-dione (D-nor-corticosterone) with ethylene glycol and p-toluenesulfonic acid in benzene, whereby is formed the 3,20-bis-ethylene ketal derivative which is first acetylated at C-21 by means of acetic anhydride in pyridine and then esterified at C-11 by means of nitrosyl chloride in pyridine to form a key intermediate, the 3,20-bis-ethylene ketal of D-nor-4-pregnene-11β,21-diol-3,20-dione 11-nitrite 21-acetate. Photolysis of the latter compound in toluene solution by irradiation with ultraviolet light according to procedures outlined by Barton and Beaton, J. Am. Chem. Soc. 83, 750 (1961) yields the 3,20-bis-ethylene ketal of 18-oximino-D-nor-4-pregnene-11β,21-diol-3,20-dione 21-acetate which, when treated with nitrous acid affords the 3,20-bis-ethylene ketal derivative of 18-oxo-D-nor-4-pregnene-11β,21-diol-3,20-dione 21-acetate ("aldo" form) which on treatment with 90% aqueous acetic acid yields D-nor-aldosterone acetate in its hemiacetal form, i.e., 11β,18-oxido-D-nor-4-pregnene-18,21-diol-3,20-dione 21-acetate. D-nor-aldosterone acetate possesses mineral-corticoid properties.

15α,16α-ketal and acetal derivatives of my novel D-nor-15α-hydroxycorticoids, which are highly potent anti-inflammatory agents, may be prepared from the latter by conventional methods. Thus, treatment of D-nor-1,4-pregnadiene-11β,15α,16α,21-tetrol - 3,20 - dione with acetone in the presence of p-toluenesulfonic gives the corresponding 15α,16α-acetonide.

The 16α,21-ketal and acetal derivatives of my novel D-nor corticoids may also be prepared in the usual manner. These compounds are useful anti-inflammatory agents in their own right and are also useful intermediates for the preparation of other useful corticoids such as the 21-lower alkyl-D-nor corticoids. For example, D-nor-prednisolone, on treatment with dimethoxypropane in dimethyl formamide in the presence of a strong acid such as p-toluenesulfonic acid, gives D-nor-prednisolone 16α,21-acetonide. The latter compound may be alkylated and the acetonide function hydrolyzed to give 21-alkyl D-nor-prednisolone. Thus D-nor-prednisolone 16α,21-acetonide on treatment with potassium butoxide followed by methyl iodide gives 21-methyl-D-nor-prednisolone 16α,21-acetonide, which is hydrolyzed with hot aqueous acetic acid to yield 21-methyl-D-nor-prednisolone.

16α,20:20,21-bismethylenedioxy derivatives of my D-nor-steroids having a 16α,21-dihydroxy-20-keto system may be prepared by procedures similar to those described in the literature for C–17 steroids. These compounds are useful intermediates in carrying out further transformations of the molecule with full protection of the sensitive dihydroxy keto side-chain. The bismethylenedioxy derivative may subsequently be hydrolyzed with regeneration of the corticoid side-chain. For example, D-nor-hydrocortisone is converted to the 16α,20:20,21-bis-methylene-dioxy derivative by treatment with formaldehyde and hydrochloric acid in chloroform. The derivative is then condensed with dimethyl oxalate in the presence of base to give the 2-methoxalyl derivative. Treatment of the latter with methyl iodide and base gives the bismethylene dioxy derivative of 2α-methyl-D-nor-hydrocortisone. The bismethylenedioxy group is then hydrolyzed by heating with formic acid to give 2α-methyl-D-nor-hydrocortisone.

21-halogeno-20-keto-D-nor-steroids are readily prepared from 21-hydroxy-20-keto-D-nor-steroids of my invention. The 21-hydroxy group is converted to a suitable sulfonate ester, such as the methanesulfonate and the latter replaced by a halogen atom by treatment with an alkali metal halide salt such as lithium chloride, lithium bromide or sodium iodide. For the synthesis of 21-fluoro compounds it is preferably to prepare the 21-iodo compound from the sulfonate and then replace with fluoride by treatment with silver fluoride in moist acetonitrile. For example, D-nor-desoxycorticosterone (D-nor-4-pregnene-21-ol-3,20-dione) is converted to the 21-methanesulfonate with methanesulfonyl chloride in pyridine. Treatment with sodium iodide in acetone gives 21-iodo-D-nor-progesterone which on treatment with silver fluoride in moist acetonitrile yields 21-fluoro-D-nor-progesterone. Similarly, D-nor-prednisolone is converted to D-nor-prednisolone 21-methanesulfonate; thence to 21-iodo-D-nor-1,4-pregnadiene-11β,16α-diol-3,20-dione and finally to 21-fluoro-D-nor-1,4-pregnadiene-11β,16α-diol-3,20-dione.

6-methylene derivatives of my novel D-nor-steroids are prepared from 6-methyl-D-nor-4-pregnen-3-ones. Thus a D-nor-6-methyl-3-keto-4-dehydro steroid is converted to its 3-alkyl enol ether for example with an alkyl orthoformate and the corresponding alcohol in the presence of an acid catalyst, and the latter allowed to react with active manganese dioxide, freshly prepared according to the procedure of U.S. Patent 2,980,711, resulting in the formation of the desired D-nor-6-methylene-3-keto-4-dehydro steroid. The latter may be converted to the corresponding 1-dehydro analog in the usual manner, for example, by treatment with dichlorodicyanobenzoquinone. For example, 6α-methyl-D-nor-hydrocortisone 21-acetate on treatment with ethylorthoformate, ethanol and p-toluenesulfonic acid in dioxane gives the 3-ethyl enol ether, 3 - ethoxy - 6 - methyl - D - nor - 3,5 - pregnadiene - 11β, 16α,21-triol-20-one 21-acetate. Reaction of the latter compound with active manganese dioxide in benzene results in the formation of 6-methylene-D-nor-hydrocortisone 21-acetate. Dehydrogenation with one equivalent of dichlorodicyanobenzoquinone in dioxane gives 6-methylene-D-nor-prednisolone 21-acetate.

The 15-methyl-D-nor-corticoids of my invention may alternatively be prepared from the 15-methyl-D-nor-pregnenolones, i.e. 15α-methyl-D-nor-5-pregnen-3β-ol-20-one and 15β-methyl-D-nor-5-pregnen-3β-ol-20-one by conversion to the 15-methyl-D-nor-progesterones via Oppenauer oxidation, hydroxylation with Glomerella cingulata or Rhisopus nigricans according to known procedures to give 15α - methyl - 11α-hydroxy-D-nor-progesterone and 15β-methyl - 11α-hydroxy-D-nor-pprogesterone, respectively. The latter compounds are oxidized to the 11-ketones with chromic acid and then carried through the sequence of reactions for the elaboration of the corticoid structures according to procedures outlined in J. Am. Chem. Soc. 77: 4436 (1955) to give 15α-methyl-D-nor-prednisolone and 15β-methyl-D-nor-prednisolone respectively.

Still alternatively, 15α-methyl-9α-fluoro-D-nor-prednisolone may be prepared from 15a-methyl-D-nor-5-pregnen-3β-ol-20-one according to procedures outlined in J. Am. Chem. Soc. 80: 4431 (1958) for the preparation of 16α-methyl-9α-fluoroprednisolone.

The esters of my D-nor-steroids are prepared according to conventional techniques. Thus, lower alkanoyl esters are prepared by reacting the corresponding hydroxy compound with pyridine and an acid anhydride. For example, D-nor-prednisolone, upon reaction with acetic anhydride in pyridine yields the corresponding acetate ester, D-nor-prednisolone 21-acetate. By substituting other lower alkanoic acid anhydrides such as propionic anhydride, or caproic anhydride, there is obtained the corresponding propionate or caproate ester.

In order to esterify an 11β- and/or a 16α-hydroxy group in compounds such as 16α-hydroxy-D-nor-progesterone and D-nor-prednisolone 21-acetate, one may use the esterifying acid in the presence of trifluoro acetic anhydride or the anhydride of the esterifying acid in the presence of strong acid catalyst such as p-toluene sulfonic acid. For example, 16α-hydroxy-D-nor-progesterone and D-nor-prednisolone 21-acetate upon treatment with acetic acid in the presence of trifluoro acetic anhydride yields, respectively, 16α-acetoxyprogesterone and D-nor-prednisolone triacetate.

Other 21-esters of my 21-hydroxy-D-nor-pregnanes are prepared by known methods. Thus, D-nor-pregnanes such as D-nor-prednisolone and D-nor-prednisone upon reaction in pyridine with a dicarboxylic acid anhydride such as succinic or phthalic anhydride; or acid halides of aryl carboxylic acids such as benzoyl chloride will yield the corresponding 21-ester, i.e. the 21-succinate, 21-phthalate, or 21benzoate, respectively, of D-nor-prednisolone and D-nor-prednisone.

The 21-inorganic acid esters of my 21-hydroxy-D-nor-pregnanes are also prepared utilizing known techniques. For example, D-nor-prednisolone is converted to its 21-iodide via the 21-methanesulfonate or 21-p-toluenesulfonate, followed by treatment with silver dihydrogen phosphate as described in Chemistry and Industry, p. 1260 (1958). Other known techniques may also be used. An alkali metal salt of the 21-phosphate, such as the disodium salt is then conveniently formed by reaction of the phosphate ester with sodium hydroxide to give D-nor-prednisone 21-disodium phosphate.

The following are examples which illustrate our invention. It is to be understood that the invention is not to be limited to the exact details of operation or exact compounds shown and described as obvious modifications and equivalents will be apparent to one skilled in the art; the invention is therefore to be limited only by the scope of the appended claims.

EXAMPLE 1

*D-nor-4-pregnene-21-ol-3,20-dione (D-nor-desoxycorticosterone and the 21-acetate ester thereof)*

A. 16-DIAZO-4-ANDROSTENE-3,17-DIONE

Subject 16-diazo-5-androstene-3β-ol-17-one to the action of a culture of *Flavobacterium dehydrogenans* (Rutgers Collection No. 130) as follows:

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | Grams |
|---|---|
| Yeast extract (Difco) | 10 |
| Potassium phosphate monobasic | 4.48 |
| Sodium phosphate dibasic | 4.68 |

Tap water to 1 liter.

This culture medium has previously been autoclaved, at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 16-diazo-5-androstene-3β-ol-17-one dissolved in a minimum volume of ethanol. The reaction mixtures are then shaken at 30° C. for 12 to 72 hours. The reaction is stopped when paper chromatography indicates that there is no more starting material.

The contents of the flasks are combined and extracted with methylene chloride. The extracts are concentrated and the residue is crystallized from acetone-hexane yielding 16-diazo-4-androstene-3,17-dione.

B. D-NOR-4-ANDROSTENE-3-ONE-16β-CARBOXYLIC ACID

Irradiate a solution of 5 g. of 16-diazo-4-androstene-3,17-dione in 5 ml. of aqueous dioxane for 4 hours with a 200 watt mercury lamp provided with a Corax sleeve. Remove the solvent under reduced pressure and triturate the resultant residue with water and dry giving D-nor-4-androstene-3-one-16β-carboxylic acid. Purify by crystallization from acetone.

C. D-NOR-4-ANDROSTENE-3-ONE-16β-CARBOXYLIC ACID CHLORIDE

Chill in an ice bath a solution of 500 mg. of D-nor-4-androstene-3-one-16β-carboxylic acid in 20 ml. of dry benzene containing 5 drops of pyridine then add 2 ml. of oxalyl chloride. Stir the mixture at room temperature for 1 hour under anhydrous conditions then remove the solvent under reduced pressure. Add 20 ml. of dry benzene to the resultant residue then filter the solution discarding the insolubles. Concentrate the benzene filtrate to a residue of substantially D-nor-4-androstene-3-one-16β-carboxylic acid chloride which is used without further purification in procedure B of this example.

D. 21-DIAZO-D-NOR-4-PREGNENE-3,20-DIONE

To a solution of the D-nor-4-androstene-3-one-16β-carboxylic acid chloride in 20 ml. of benzene add an ethereal solution of diazomethane until a persistent yellow color is obtained. Keep the mixture at room temperature for 30 minutes then concentrate in vacuo to a residue substantially of 21-diazo-D-nor-4-pregnene-3,20-dione. Purify by crystallization from acetone-hexane.

E. D-NOR-4-PREGNENE-21-OL-3,20-DIONE 21-ACETATE (D-NOR-DESOXYCORTICOSTERONE ACETATE)

Slowly add 180 mg. of 21-diazo-D-nor-4-pregnene-3,20-dione to 10 ml. of boiling acetic acid. Heat the resulting solution under reflux for 5 minutes then remove the solvent under reduced pressure. Purify the resultant residue by crystallization from acetone-ether to give D-nor-4-pregnene-21-ol-3,20-dione 21-acetate.

F. D-NOR-DESOXYCORTICOSTERONE

To a solution of 250 mg. of D-nor-desoxycorticosterone acetate in 25 ml. of methanol, add 1.5 ml. of 10% aqueous potassium carbonate. Stir the mixture under nitrogen for one hour then neutralize with 10% acetic acid. Dilute with water, then remove the methanol in vacuo. Filter the resultant precipitate of substantially D-nor-desoxycorticosterone. Purify by crystallization from acetone-hexane.

EXAMPLE 2

*D-nor-4-pregnene-16α,21-diol-3,20-dione*

A. 21,21-DIBROMO-D-NOR-4-PREGNENE-3,20-DIONE

To a stirred solution of 5 g. of 21-diazo-D-nor-4-pregnene-3,20-dione (the compound of Example 1D) in 100 ml. of chloroform add dropwise a solution of 2.5 g. of bromine in 15 ml. of chloroform. Continue stirring until the bubbling has stopped and the bromine color has been discharged. Remove the solvent at room temperature under reduced pressure to a residue of substantially 21,21-dibromo-D-nor-4-pregnene-3,20-dione which is used without further purification in the procedure immediately following.

B. METHYL D-NOR-4,16(20)-PREGNADIENE-3-ONE-21-OATE

To a solution of 2 g. of 21,21-dibromo-D-nor-4-pregnene-3,20-dione in 40 ml. of methanol add 15 ml. of an 8% solution of sodium methoxide in methanol. Stir the mixture under nitrogen at room temperature for 16 hours then pour it into cold water and extract the mixture with chloroform. Wash the combined chloroform extracts with water then concentrate under reduced pressure to a residue of substantially methyl D-nor-4-pregnene-4,16(20)-pregnadiene-3-one-21-oate. Purify the residue by chromatography on Florisil eluting with hexane-ether-acetone mixtures. Combine like fractions on the basis of ultraviolet and infrared spectra, retaining those fractions wherein the infrared spectra indicates the presence of an ester group and whose ultraviolet spectra indicates the presence of two conjugated systems. Combine the selected fractions and concentrate to a residue and crystallize from acetone-hexane.

C. METHYL D-NOR-5,16(20)-PREGNADIENE-3-ONE-21-OATE 3-ETHYLENE KETAL

To a solution of 1.5 g. of methyl D-nor-4,16(20)-pregnadiene-3-one-21-oate in 150 ml. of benzene add 7.5 ml. of ethylene glycol and 0.15 g. of p-toluenesulfonic acid. Stir the mixture at reflux temperature for 6 hours then cool and wash with 100 ml. of 1% aqueous sodium bicarbonate. Put the washed benzene solution on a column of Florisil and elute with ether. Combine the fractions and evaporate to a residue containing substantially methyl D-nor-5,16(20)-pregnadiene-3-one-21-oate 3-ethylene ketal. Purify by crystallization from acetone-hexane.

D. D-NOR-5,16(20)-PREGNADIENE-21-OL-3-ONE 3-ETHYLENE KETAL

Add dropwise with stirring a solution of 1 g. of methyl D-nor-5,16(20)-pregnadiene-3-one 21-oate 3-ethylene ketal in 50 ml. of freshly distilled tetrahydrofuran, to a suspension of 500 mg. of lithium aluminum hydride in 25 ml. of tetrahydrofuran. Heat the mixture at reflux temperature for 1 hour then chill and add dropwise 10 ml. of ethyl acetate followed by 5 ml. of a saturated aqueous solution of sodium sulfate. Finally add some solid sodium sulfate and filter the mixture. Remove the solvent from the filtrate under reduced pressure to a residue of substantially D-nor-5,16(20)-pregnadiene-21-ol-3-one 3-ethylene ketal. Purify by crystallization with ether.

E. D-NOR-4,16(20)-PREGNADIENE-21-OL-3-ONE

To a solution of 500 ml. of D-nor-5,16(20)-pregnadiene-21-ol-3-one 3-ethylene ketal in 40 ml. of 80% aqueous acetone add 0.5 ml. of sulfuric acid. Keep the mixture at room temperature for 18 hours then add aqueous sodium bicarbonate until the solution is basic. Concentrate the basic solution to remove most of the acetone then add water. The resultant precipitate is filtered, washed with water, and dried giving substantially D-nor-4,16(20)-pregnadiene-21-ol-3-one. Purify by crystallization from acetone-hexane.

F. D-NOR-4,16(20)-PREGNADIENE-21-OL-3-ONE 21-ACETATE

To a solution of 2 g. of D-nor-4,16(20)-pregnadiene-21-ol-3-one in 10 ml. of pyridine add 2 ml. of acetic anhydride and keep the mixture at room temperature overnight, then pour the mixture into ice water and stir for 30 minutes. Filter the resulting precipitate of substantially D-nor-4,16(20)-pregnadiene-21-ol-3-one 21-acetate then wash with water and dry. Purify by crystallization from acetone-hexane.

G. D-NOR-4-PREGNENE-16α,21-DIOL-3,20-DIONE 21-ACETATE

To a solution of 500 mg. of D-nor-4,16(20)-pregnadiene-21-ol-3-one 21-acetate in 50 ml. of dry t-butanol add 0.3 ml. of pyridine and 1.2 ml. of t-butanol containing 11 mg. of osmium tetroxide. To this mixture add dropwise with stirring 4.8 ml. of an 0.82N solution of hydrogen peroxide in dry t-butanol. Keep the reaction mixture at room temperature for 5 hours then bubble nitrogen through the solution for 15 minutes followed by the addition of 600 mg. of sodium sulfite in 30 ml. of water. After 5 minutes neutralize the mixture with 10% acetic acid and dilute with 200 ml. of water then extract with chloroform. Wash the combined extracts with water, then concentrate to a residue under reduced pressure. Dissolve the residue in a mixture of 5 ml. of pyridine and 1 ml. of acetic anhydride and allow to stand overnight. Pour the mixture into ice water and filter the resulting precipitate of substantially D-nor-4-pregnene-16α,21-diol-3,20-dione 21-acetate. Purify by recrystallization from acetone-hexane.

H. D-NOR-4-PREGNENE-16α,21-DIOL-3,20-DIONE

To a solution of 250 mg. of D-nor-4-pregnene-16α-21-diol-3,20-dione 21-acetate in 25 ml. of methanol add 1.5 ml. of 10% aqueous potassium carbonate and stir the mixture under nitrogen 1 hour. The mixture is then neutralized with 10% acetic acid, diluted with water, and the methanol removed under reduced pressure. Filter the resulting precipitate of substantially D-nor-4-pregnene-16α,21-diol-3,20-dione. Purify by crystallization from acetone-hexane.

EXAMPLE 3

*D-nor-4-pregnene-11β,16α,21-triol-3,20-dione (D-nor-hydrocortisone) and the 21-acetate ester thereof*

A. D-NOR-4-PREGNENE-11β,16α,21-TRIOL-3,20-DIONE

Subject D-nor-4-pregnene-16α,21-diol-3,20-dione to the action of a culture of the organism *Curvularia lunata* (N.R.R.L. 2380) in the following manner:

A living culture of the organism *Curvularia lunata* (N.R.R.L 2380) is rinsed from an agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, adjusted to pH 7.0 with potassium hydroxide 100 ml. of this medium is placed in each of several 300 ml. flasks. To each flask is added 50 mg. of D-nor-4-pregnene-16α,21-diol-3,20-dione dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1–2 ml. The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give D-nor-4-pregnene-11β,16α,21-triol-3,20-dione.

B. D-NOR-4-PREGNENE-11β,16α,21-TRIOL-3,20-DIONE 21-ACETATE

Keep at room temperature overnight a solution of 1 g. of D-nor-4-pregnene-11β,16α,21-triol-3,20-dione in 10 ml. of pyridine and 1 ml. of acetic anhydride. Pour the reaction mixture into ice water and filter the resulting precipitate of substantially D-nor-4-pregnene-11β,16α,21-triol-3,20-dione 21-acetate, wash with water and dry. Purify by crystallization from acetone-hexane.

EXAMPLE 4

*D-nor-1,4-pregnadiene-11β,16α,21-triol-3,20-dione (D-nor-prednisolone) and the 21-acetate ester thereof*

A. D-NOR-1,4-PREGNADIENE-11β,16α,21-TRIOL-3,20-DIONE

Subject D-nor-4-pregnene-11β,16α,21-triol-3,20-dione to the action of a culture of *Corynebacterium simplex* (A.T.C.C. No. 6946) in the following manner:

A solution of 1 g. of yeast extract (Difco) in one liter of tap water, the pH of which is adjusted to 6.9 is distributed among ten 300 ml. Erlenmeyer flasks and to each flask is added a loopful, 2 ml. of *Corynebacterium simplex*. The resulting suspensions are incubated at 30° C. on a shaking machine for 18 hours. One-half gram of D-nor-4-pregnene-11β,16α,21-triol-3,20-dione is dissolved in 25 ml. of acetone and the resulting solution is distributed equally among the ten flasks containing the 18-hour growth of C. simplex. The culture containing the D-nor-pregnene-3,20-dione is then incubated at 30° C. for 24 hours. At the end of 24 hours, the contents of the flasks are combined and extracted with a total of 3 liters of chloroform. The crude chloroform extract from the transformation is then concentrated to a residue which is crystallized from acetone-hexane, affording D-nor-1,4-pregnadiene-11β,16α,21-triol-3,20-dione.

B. D-NOR-1,4-PREGNADIENE-11β,16α,21-TRIOL-3,20-DIONE 21-ACETATE

In the manner described in Example 3B acetylate D-nor-1,4-pregnadiene-11β,16α,21-triol-3,20-dione with acetic anhydride in the presence of pyridine. Isolate the product in the described manner and crystallize from acetone-hexane to give D-nor-1,4-pregnadiene-11β,16α,21-triol-3,20-dione 21-acetate.

EXAMPLE 5

*D-nor-4-pregnene-16α,21-diol-3,11,20-trione (D-nor-cortisone) and the 1-dehydro analog thereof (D-nor-prednisone)*

To a solution of 200 mg. of D-nor-4-pregnene-11β,16α,21-triol-3,20-dione 21-acetate in 15 ml. of acetone add dropwise chromic acid-sulfuric acid reagent (266 mg. $CrO_3$/ml.) until a permanent orange color is obtained. Keep the solutions at room temperature for 5 minutes then add a little methanol to destroy any excess reagent. Pour the solution into ice water and extract with ether. Combine the ether extracts, wash and dry over magnesium sulfate and evaporate in vacuo to a residue which is purified by crystallization from acetone-hexane to give D-nor-4-pregnene-16α,21-diol-3,11,20-trione 21-acetate.

In a similar manner, oxidize D-nor-1,4-pregnadiene-11β,16α,21-triol-3,11-dione 21-acetate with chromic acid-sulfuric acid reagent and isolate and purify the resultant product to give D-nor-1,4-pregnadiene-16α,21-diol-3,11,20-trione 21-acetate.

In a manner similar to that described in Example 9C, treat D-nor-cortisone acetate and D-nor-prednisone acetate with 70% perchloric acid in methanol followed by neutralization with 5% sodium bicarbonate whereby is obtained D-nor-cortisone and D-nor-prednisone, respectively.

EXAMPLE 6

*D-nor-4-pregnene-11α,16α,21-triol-3,20-dione, the 21-acetate ester thereof and the 1-dehydro analog*

A. D-NOR-4-PREGNENE-11α,16α,21-TRIOL-3,20-DIONE

D-nor-4-pregnene-16α,21-diol-3,20-dione (the compound of Example 2) is subjected to the action of a culture of the micro-organism *Glomerella cingulata* (A.T.C.C. 10534) in the following manner:

Agar slants containing the following medium:

| | Gm. |
|---|---|
| Asparagine | 10 |
| Glucose | 25 |
| $KH_2PO_4$ | 0.5 |
| $MgSO_4 7H_2O$ | 0.25 |

Tap water to one liter.

and 1.5% by weight of agar are sterilized for 15 minutes at 121° C. at a pressure of 15 pounds per square inch (p.s.i.). The agar slants are then cooled to about 28° C. slanted and inoculated with a vegetative growth of a culture, *Glomerella cingulata* (A.T.C.C. 10534) and incubated at a temperature of 28° C. until heavy sporulation occurs.

A two liter Erlenmeyer flask containing 500 milliliters (ml.) of a similarly sterilized and cooled broth of the above medium is then inoculated with spores from one of the heavily sporulated agar slants and 10 ml. of antiform, Larex (1% octadecanol in lard oil) added to the culture medium, and incubated from 24 hours to 36 hours at 28° C. on a New Brunswick rotary shaker set at 280 r.p.m. At the end of this period 500 mg. of D-nor-4-pregnene-16α,21-diol-3,20-dione in 5 ml. of ethanol is added. The flask is replaced on the rotary shaker and incubation continued for a period of from 24 hours to 30 hours during which later period 10 ml. samples removed at intervals from the Erlenmeyer flask and extracted with chloroform are then chromatographed on paper (according to the method of Bush as modified by Shull) employing a toluene/ethyl acetate solvent system, the paper being impregnated with water and acetone, the latter being present as a dispersant which evaporates rapidly. Incubation is continued until chromatography indicates complete transformation of D-nor-4-pregnene-16α,21-diol-3,20-dione to D-nor-4-pregnene-11α,16α,21-triol-3,20-dione. The broth mixture in the Erlenmeyer flask is then extracted with chloroform to effect the isolation of the D-nor-4-pregnene-11α,16α,21-triol-3,20-dione from the broth mixture. The chloroform is then evaporated off in vacuo and the residue is recrystallized from acetone-ether.

B. D-NOR-1,4-PREGNADIENE-11α,16α,21-TRIOL-3,20-DIONE

Subject 4-pregnene-11α,16α,21-triol-3,20-dione to the action of a culture of the micro-organism *Corynebacterium simplex* in the manner described in Example 4A. Isolate the product in the described manner and crystallize from acetone-ether to give D-nor-1,4-pregnadiene-11α,16α,21-triol-3,20-dione.

C. D-NOR-1,4-PREGNADIENE-11α,16α,21-TRIOL-3,20-DIONE 21-ACETATE

Chill to −15° C. a solution of 2 g. of D-nor-1,4-pregnadiene-11α,16α,21-triol-3,20-dione in 10 ml. of pyridine. Then add dropwise 3 ml. of 3:1 mixture of acetic acid and acetyl chloride. After addition is complete, stir the mixture for 1 hour at −10 to −15° C. under anhydrous conditions. Pour the mixture into ice water and filter the resultant precipitate of D-nor-1,4-pregnadiene-11α,16α,21-triol-3,20-dione 21-acetate and wash well with water and dry. Purify by crystallization from acetone-hexane.

Similarly, D-nor-4-pregnene-11α,16α,21-triol-3,20-dione upon reaction with acetic acid and acetyl chloride in pyridine according to the above described procedure yields D-nor-4-pregnene-11α,16α,21-triol-3,20-dione 21-acetate.

EXAMPLE 7

*D-nor-1,4,9(11)-pregnatriene-16α,21-diol-3,20-dione 21-acetate*

A. D-NOR-1,4-PREGNADIENE-11α,16α,21-TRIOL-3,20-DIONE 11-METHANESULFONATE 21-ACETATE

To a solution of 1 g. of D-nor-1,4-pregnadiene-11α,16α,21-triol-3,20-dione 21-acetate in 10 ml. of pyridine chilled to 0° C. add 1 ml. of methanesulfonyl chloride. Keep the mixture at room temperature for 18 hours then pour into ice water containing sodium bicarbonate. Stir the mixture for 10 minutes then filter the resultant precipitate of D-nor-1,4-pregnadiene-11α,16α,21-triol-3,20-dione 11-methanesulfonate 21-acetate and wash well with water and dry. Purify by crystallization from acetone-hexane.

B. D-NOR-1,4,9(11)-PREGNATRIENE-16α,21-DIOL-3,20-DIONE 21-ACETATE

Heat to about 100° C. a solution of 2 g. of anhydrous sodium acetate in 20 ml. of acetic acid then add 1.5 g. of D-nor-1,4-pregnadiene-11α,16α,21-triol-3,20-dione 11-methanesulfonate 21-acetate. Heat the mixture under reflux for 1.5 hours then cool and dilute with water. Filter the resulting precipitate and crystallize from acetone-ether giving D-nor-1,4,9(11)-pregnatriene-16α,21-diol-3,20-dione 21-acetate.

Alternatively, the compound of this example is prepared as follows: Dissolve 1 g. of D-nor-1,4-pregnadiene-11β,16α,21-triol-3,20-dione 21-acetate (the compound of Example 4B) in 5 ml. of distilled dimethylformamide and 5 ml. of dry pyridine, then add 0.5 ml. of methanesulfonyl chloride. Heat the mixture to about 80° for 1 hour then pour into ice water with stirring. After 10 minutes, filter the resultant precipitate, wash well with water, and dissolve in acetone. Dry the acetone solution then concentrate to a residue containing D-nor-1,4,9(11)-pregnatriene-16α,21-diol-3,20-dione-21-acetate. Purify by chromatographing on Florisil eluting with 50% ether-hexane and ether. Concentrate the eluates then combine the crystalline fractions and recrystallize from acetone-ether.

EXAMPLE 8

*9α-bromo-D-nor-1,4-pregnadiene-11β,16α,21-triol-3,20-dione 21-acetate*

Cool in an ice bath a mixture of 500 mg. of D-nor-1,4,9(11) - pregnatriene-16α,21-diol-3,20-dione 21-acetate in 40 ml. of purified tetrahydrofuran and 8 ml. of water. Then add 250 mg. of N-bromoacetamide followed by 2.5 ml. of 1.5 N perchloric acid. Stir the mixture in the dark at room temperature for 3 hours. Add with stirring a solution of 500 mg. of sodium sulfite in 5 ml. of water then dilute the mixture with water and extract with methylene chloride. Wash the combined extracts with aqueous sodium bicarbonate, then water, dry over magnesium sulfate and concentrate in vacuo to a residue of substantially 9α-bromo - D - nor-1,4-pregnadiene-11β,16α,21-triol-3,20-dione 21-acetate. Purify by crystallization from acetone-hexane.

EXAMPLE 9

*9α-fluoro-D-nor-1,4-pregnadiene-11β,16α,21-triol-3,20-dione (9α-fluoro-D-nor-prednisolone)*

A. 9β,11β-OXIDO-D-NOR-1,4-PREGNADIENE-16α,21-DIOL-3,20-DIONE 21-ACETATE

To a solution of 300 mg. of 9α-bromo-D-nor-1,4-pregnadiene-11β,16α,21-triol-3,20-dione 21-acetate in 20 ml. of acetone add 500 mg. of potassium acetate. Heat the mixture under reflux for 16 hours then concentrate to a volume of about 10 ml. under reduced pressure. Pour the residual solution into ice water. Filter the resulting precipitate and crystallize from acetone-hexane to give 9β,11β - oxido-D-nor-1,4-pregnadiene-16α,21-diol-3,20-dione 21-acetate.

B. 9α-FLUORO-D-NOR-1,4-PREGNADIENE-11β,16α,21-TRIOL-3,20-DIONE 21-ACETATE

Place in a polyethylene container a solution of 500 mg. of 9β,11β - oxido-D-nor-1,4-pregnadiene-16α,21-diol-3,20-dione 21-acetate in 20 ml. of methylene chloride and cool in an ice bath. Add with stirring 2 ml. of 48% aqueous hydrofluoric acid then stir the mixture vigorously in the cold for 3 hours. Pour the reaction mixture into cold aqueous sodium bicarbonate solution then separate the layers. Wash the organic layer with water and concentrate under reduced pressure to a residue of substantially 9α - fluoro - D-nor-1,4-pregnadiene-11β,16α,21-triol-3,20-dione 21-acetate. Purify by crystallization from acetone-hexane.

C. 9α-FLUORO-D-NOR-1,4-PREGNADIENE-11β,16α,21-TRIOL-3,20-DIONE

Hydrolyze 50 mg. of 9α-fluoro-D-nor-1,4-pregnadiene-11β,16α,21-triol-3,20-dione 21-acetate by stirring in 5 ml. of methanol containing 0.12 ml. of 70% perchloric acid at room temperature for 16 hours. Neutralize the solution with 5% sodium bicarbonate, dilute with water, and extract with methylene chloride. Combine the organic extracts, wash with water, and concentrate under reduced pressure to a residue of substantially 9α-fluoro-D-nor-1,4 - pregnadiene-11β,16α,21-triol-3,20-dione. Purify by crystallization from acetone-hexane.

EXAMPLE 10

*9α-chloro-D-nor-1,4-pregnadiene-11β,16α,21-triol-3,20-dione 21-acetate*

To a solution of 100 mg. of 9β,11β-oxido-D-nor-1,4-pregnadiene-16α,21-diol-3,20-dione 21-acetate in 20 ml. of chloroform at 0° C. add 2 ml. of a saturated solution of hydrogen chloride in chloroform. Keep the solution at 0° C. for 2 hours then wash with sodium acetate solution and water and concentrate under reduced pressure to a residue of substantially 9α-chloro-D-nor-1,4-pregnadiene-11β,16α,21-triol-3,20-dione 21-acetate. Purify by crystallization from acetone-hexane.

By following a procedure similar to that described in Example 9C the 21-acetate of this example may be hydrolyzed to the corresponding 21-alcohol, i.e. 9α-chloro-D-nor-1,4-pregnadiene-11β,16α,21-triol-3,20-dione.

I claim:

1. A member selected from the group consisting of 9α - X - 11 - Y-16α-Z-21-R-D-nor-4-pregnene-3,20-dione and the 1-dehydro analogs thereof wherein X is a member selected from the group consisting of hydrogen, fluorine, chlorine, and bromine; Y is a member selected from the group consisting of β-chlorine, keto and β-hydroxy, and when Y is chlorine, X is a member selected from the group consisting of chlorine and bromine; Z is a member selected from the group consisting of hydrogen and hydroxy; and R is a member selected from the group consisting of hydroxy and lower alkanoyloxy.

2. A compound according to claim 1 wherein X and Z are hydrogen, and Y and R are hydroxy, said compound being D-nor-corticosterone.

3. A compound according to claim 1 wherein X, Y and Z are hydrogen, and R is hydroxy, said compound being D-nor-desoxycorticosterone.

4. A compound according to claim 1 wherein X is hydrogen, Y is keto, Z and R are hydroxy, said compound being D-nor-cortisone.

5. A compound according to claim 1 wherein X is hydrogen, Y is β-hydroxy, and Z and R are hydroxy, said compound being D-nor-hydrocortisone.

6. A 1-dehydro compound according to claim 1 wherein X is hydrogen, Y is keto, and Z and R are hydroxy, said compound being D-nor-prednisone.

7. A 1-dehydro compound according to claim 1 wherein X is hydrogen, Y is β-hydroxy, and Z and R are hydroxy, said compound being D-nor-prednisolone.

References Cited

Cava et al., J. Am. Chem. Soc., vol. 84, pp. 115 and 116 (1962).

Mateos et al., Boletin Del Institute Quimica, U.N.A.M., vol. 13, pp. 3–5 (1961).

Meinwald et al., J. Am. Chem. Soc., vol. 84, pp. 116 and 117 (1962).

Stecher et al., The Merck Index, Seventh Edition, pp. 287, 328, 531, 848 and 849 (1960).

LEON ZITVER, *Primary Examiner.*

M. JACOB, *Assistant Examiner.*